United States Patent Office 3,028,667
Patented Apr. 10, 1962

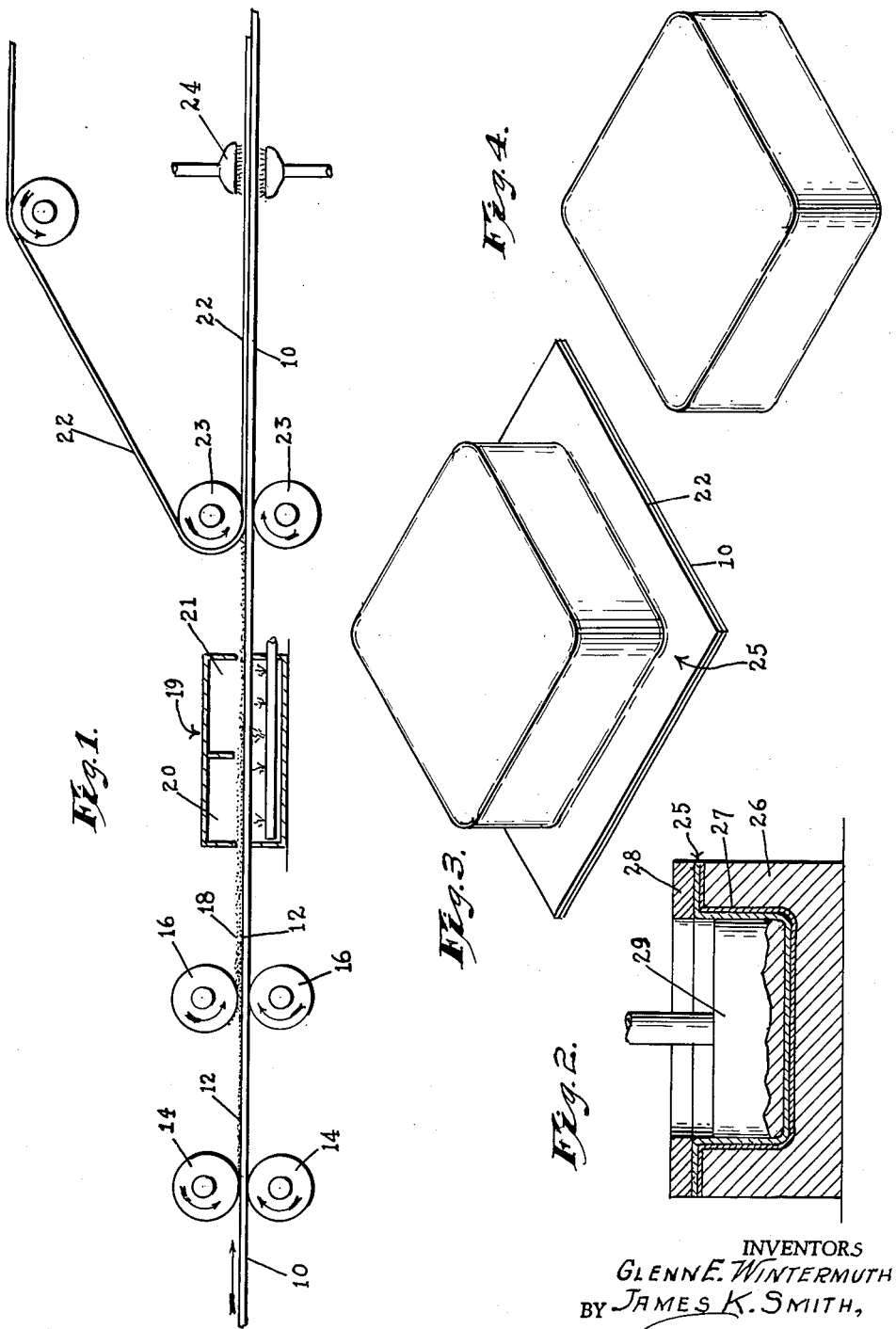

3,028,667
METHOD OF FORMING LAMINATED ARTICLES
Glenn E. Wintermute and James K. Smith, Columbus, Ind., assignors to Arvin Industries, Inc., Columbus, Ind., a corporation of Indiana
Filed Apr. 7, 1958, Ser. No. 726,710
5 Claims. (Cl. 29—529)

This invention relates to the manufacture of a laminated article, and more especially to the production of an article in which a flexible skin is bonded to a sheet of metal, or other supporting member, and the laminate thus produced is subjected to a drawing or forming operation.

Heretofore, such laminates that have been deep drawn have not been able to withstand certain conditions of use and/or storage. In such instances where a deep drawn laminated article is subjected to elevated temperatures the flexible skin covering delaminates and pulls away from the supporting member, thereby rendering the article unusable. Normally the deeper the draw the lower will be the delaminating temperature, and vice versa. In many formed articles the deformation could be great enough to result in delamination at ordinary temperatures.

It is an object of this invention to produce economically a laminated article of the type above referred to which will be free from the difficulties described above. More specifically, it is an object of this invention to produce a laminated article which will be heat stable after having been drawn or otherwise worked to any desired shape without subsequent delamination.

In carrying out the preferred form of our invention, we coat a cleaned sheet of metal with an adhesive selective for adhesion to metal. A coating of a second adhesive having an adhesive selectivity for said first adhesive and for a flexible skin to be bonded to the metal is applied to the coating of said first adhesive. After the adhesive coated metal sheet is passed through a heat treatment to soften the adhesive and remove any undesirable solvents that may be present in the adhesives, a thin sheet of a thermoplastic skin is bonded to the coated metal sheet to form a laminated skin covered panel.

In order to form the panel into the desired shape, it is blanked and placed in a die where it is worked into the desired shape. The laminated blank used in the forming operation is large enough to permit the panel to be formed in a die while leaving a marginal flange disposed around the formed extent of the panel, the marginal laminating bonds being relatively undisturbed during the drawing operation. After this forming operation, the panel is removed from the die and heat-cured to a temperature in the range of 200° F.–350° F. During such heat-curing, the marginal flange is retained on the panel to provide a support for the laminating bonds within the extent of the formed portion of said panel; said marginal flange being removed after the heat-curing operation.

The accompanying drawings illustrate one embodiment of our invention. In such drawings:

FIG. 1 is a diagrammatic view illustrating one method of producing a continuous laminated sheet which can be cut into sections to be worked into the desired shape;

FIG. 2 is a sectional view showing apparatus that can be employed for forming the laminated panels into the desired shape;

FIG. 3 is an isometric view of a laminated panel formed in the apparatus of FIG. 2; and FIG. 4 is an isometric view of a finished laminated article made in accordance with our invention.

In forming laminated plastic covered metal articles in quantity production, it is convenient to laminate continuous strips of metal with a plastic skin and to cut from such strips the blanks from which the articles are to be formed. Such an operation is shown in FIG. 1, where the upper face of a previously cleaned metal sheet 10 is shown as coated with a suitable adhesive 12 by passing said sheet between a pair of coating rollers 14. Desirably, the adhesive 12 is a thermoplastic-thermosetting resin mixture, having an adhesive selectivity for the metal sheet 10. One such adhesive that we have employed with satisfactory results is the Dennis Chemical Company's Denflex #2394. After the metal-selective adhesive 12 is applied to the metal strip, said strip is passed between a second pair of coating rollers 16 which deposit a layer of a second adhesive 18 over the adhesive 12. Desirably, the adhesive 18, which has an adhesive selectivity for the adhesive 12 and for a thermoplastic skin is to be bonded to the metal sheet 10, is a thermoplastic-thermosetting resin mixture. One such adhesive that we have employed with satisfactory results is the Dennis Chemical Company's Laminating Adhesive #2396. Alternatively, the sheet 10 may be coated with a single bonding mixture of thermoplastic and thermosetting adhesive, such as the Stanley Chemical Company's Plastisol Primer #69x–1406, having an adhesive selectivity for the metal and the flexible skin to be bonded thereon. The metal strip 10 coated with the adhesive 12 and 18 is then passed through a two stage oven 19 which heats said strip and the adhesive. The first stage 20 of the oven 19 which is maintained at a temperature in the range of 350° F. to 450° F. preheats the strip and adhesives for passage through the second stage 21 of the oven 19 which is maintained at a temperature in the range of 500° F. to 550° F. During passage through the oven 19 the adhesives 12 and 18 are softened to condition them for bonding and any undesired solvents are removed. We have found that the adhesives can be conditioned for bonding by having the coated strip remain in each stage of the oven 19 for a period of say 30 to 90 seconds when the two stages of the oven are operating in the temperature ranges described above.

A continuous sheet of a thermoplastic skin 22, such as polyvinylchloride, then is brought into contact with, and bonded to, the metal sheet 10 by passing the two continuous sheets between a pair of pressure rollers 23. The rollers 23 bring the superimposed sheets into intimate contact, with the softened adhesives 12 and 18 bonding the skin 22 to the metal 10. After passing through the rollers 23 the skin-covered metal sheet is cooled with water sprays 24, or any other suitable means, to set the bonds of the laminate, and the laminated strip is then blanked into panels of the desired size and shape.

In most applications of laminated panels, the panels are drawn or otherwise formed into some predetermined shape. Such forming operations disturb the skin-metal laminating bonds and create stresses in the skin covering, both of which make the drawn laminate highly susceptible to subsequent delamination. In practicing our invention, a laminated panel produced as described above is blanked to a size sufficiently large to provide a marginal flange 25 around the extent of the panel that is to be drawn. The panel is then placed in a die 26 having a die cavity 27 with the marginal flange 25 being held rigidly against the upper face of the portion of the die surrounding the cavity 27 by a retainer ring 28. As shown in FIG. 2, a punch 29 is then forced against the panel drawing the central portion thereof into the die 26 until it conforms to the shape of the die cavity 27, the flange 25 being retained against the upper die face. The drawn panel is removed from the die 26 and heat-cured to a temperature in the range of 200° F. to 350° F. to reset the adhesive bonds and relieve the stresses in the skin 22 created by the drawing operation. The temperatures used in such a heat-curing operation will depend, of course, on the thicknesses of the skin and sheet metal employed, and the length of time that the panel is to be heated. For example, we have achieved excellent results by heat-curing a drawn laminate comprised of 24 gauge steel and 10 mil polyvinylchloride at 300° F. for fifteen minutes. Any convenient method of heating may be employed, such as ovens, resistance heating, dielectric heating, and the like.

During the heat-curing operation, we retain the marginal flange 25 on the drawn panel, as shown in FIG. 3, to provide a support disposed laterally beyond the formed extent of the article which supports the skin-metal lamination bonds within the extent of the formed portion of said article. This laterally disposed support in combination with the heat-curing operation permits an unrestrained resetting of the disrupted adhesive bonds and a removal of the stresses in the skin 22 so that the skin 22 will not subsequently pull away from the metal 10 when the article is subjected to elevated temperatures. Additional support may be provided for such resetting of the adhesive bonds by forcing the flexible skin against the metal at a point disposed laterally outwardly from the formed extent of the panel. Such additional support may be provided by a clamp disposed on the marginal flange 25 and holding the skin and metal rigidly together along the extent of said flange. After the heat-curing operation, the now heat stable, drawn laminate is trimmed to remove its marginal flange 25, as shown in FIG. 4.

We claim as our invention:

1. A method of forming a laminated article, comprising the steps of bonding a skin of a flexible sheet of thermoplastic material to a metal sheet to produce a laminated skin covered panel, said skin and metal sheet being bonded together by an adhesive having a thermoplastic component and interposed between said skin and sheet, placing said panel on a die having a die cavity with the margin of said panel extending outwardly beyond the edges of the die cavity, forcing the central portion of said panel into said die cavity to form said panel into the desired shape, removing the formed panel from said die and heat-curing it while supporting the adhesive laminating bonds within the formed extent of the panel, said heat-curing step sufficiently raising the temperature of the adhesive to reset the laminating bonds of the thermoplastic adhesive component and relieve the strains in the skin without affecting the physical properties of the metal sheet, and removing the marginal portions of the formed article after the heat-curing step.

2. A method of forming a laminated article, comprising the steps of applying a thin coating of an adhesive having a thermoplastic component to a metal sheet and subjecting said adhesive coated sheet to a temperature in the range of from about 350° F. to about 550° F., bonding a skin of a flexible sheet of thermoplastic material to said adhesive coated sheet while said sheet is still at an elevated temperature to produce a laminated skin covered panel, placing said panel on a die having a die cavity with the margin of said panel extending outwardly beyond the edges of the die cavity, forcing the central portion of said panel into said die cavity to form said panel into the desired shape, removing the formed panel from said die and heat-curing it to a temperature in the range of from about 200° F. to about 350° F. while supporting the laminating bonds within the formed extent of the panel to reset the laminating bonds of the thermoplastic adhesive component and relieve the strains in the skin without affecting the physical properties of the metal sheet, and removing the marginal portions of the formed article after the heat-curing step.

3. A method of forming a laminated article, comprising the steps of bonding a skin of a flexible sheet of thermoplastic material to a metal sheet to produce a laminated skin covered panel, said skin being bonded to the metal sheet by a metal-selective adhesive applied to said metal sheet and a second adhesive applied to said metal-selective adhesive and having an adhesive selectivity for said metal-selective adhesive and for said skin, at least one of said adhesives having a thermoplastic component and having been activated by preheating at a temperature in the range of from about 350° F. to about 550° F. at the time said skin and metal sheet are bonded together, placing said panel on a die having a die cavity with the margin of said panel extending outwardly beyond the edges of the die cavity, forcing the central portion of said panel into said die cavity to form said panel into the desired shape, removing the formed panel from said die and heat-curing it at a temperature in the range of from about 200° F. to about 350° F. while supporting the laminating bonds within the formed extent of the panel, and removing the marginal portions of the formed article after the heat-curing step.

4. A method of forming a laminated article as set forth in claim 3 in which said adhesives are thermoplastic-thermosetting resin mixtures.

5. A method of forming a laminated article, comprising the steps of bonding a skin of a flexible sheet of thermoplastic material to a metal sheet to produce a laminated skin covered panel, said skin and metal sheet being bonded together by a thermoplastic adhesive, subjecting the central portion of said panel inwardly from its marginal portions to a plurality of different depth drawing operations to successively draw the central portion of the panel out of the plane of said marginal portions, heat-curing said panel after the greatest depth drawing operation to a temperature sufficient to reset the adhesive laminating bonds and relieve the strains in the skin without affecting the physical properties of the metal sheet, and removing the marginal portions of the formed article after the last drawing operation.

References Cited in the file of this patent

UNITED STATES PATENTS

| | | |
|---|---|---|
| 2,653,884 | Hussey et al. | Sept. 29, 1953 |
| 2,801,604 | Russell et al. | Aug. 6, 1957 |
| 2,850,999 | Kaplan et al. | Sept. 9, 1958 |
| 2,852,840 | Harvey | Sept. 23, 1958 |